United States Patent [19]

Genest et al.

[11] 4,097,728

[45] Jun. 27, 1978

[54] APPARATUS FOR PROVIDING AND SENSING CODED INFORMATION

[75] Inventors: Leonard J. Genest, Huntington Beach; Daryle Messner, Buena Park, both of Calif.

[73] Assignee: Monitron Industries, Santa Ana, Calif.

[21] Appl. No.: 631,558

[22] Filed: Nov. 13, 1975

Related U.S. Application Data

[63] Continuation-in-part of Ser. No. 430,247, Jan. 2, 1974.

[51] Int. Cl.² .................... G06K 7/08; G06K 19/00
[52] U.S. Cl. ........................... 235/439; 235/488
[58] Field of Search ............... 235/61.11 H, 61.11 R, 235/61.12 N, 61.12 M

[56] References Cited

U.S. PATENT DOCUMENTS

| | | | |
|---|---|---|---|
| 3,627,993 | 12/1971 | Cooper, Jr. | 235/61.11 H |
| 3,699,311 | 10/1972 | Dunbar | 235/61.11 H |
| 3,869,082 | 3/1975 | Ludin | 235/61.11 H |
| 3,919,528 | 11/1975 | Cooper et al. | 235/61.11 H |

Primary Examiner—Daryl W. Cook

[57] ABSTRACT

A data combination card is provided which includes a thin electrically non-conductive, non-metallic substrate. A thin layer of metal is secured to a portion of one side of the substrate. Holes are selectively formed in the metal layer in data positions which, when taken together with the remainder of the metal layer, constitute binary coded information. The substrate is folded over upon itself to provide a composite coded card with the metal layer between two outer layers of the substrate. The card is adapted to be inserted into a card reader housing which contains a protrusion extending into the card reader housing to prohibit access to that portion of the housing. Discrete sensing means are mounted in the card reader housing to detect the presence or absence of an adjacent metal area. The card reader receives the card in a manner to position the metal layer adjacent the sensing means. A notch is formed in one side of the card to receive the card reader protrusion so that the card may be fully inserted into the reader housing in only one position, thereby aligning the sensing means with the data positions.

11 Claims, 13 Drawing Figures

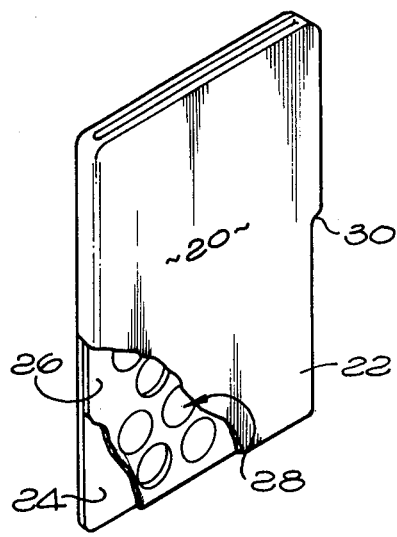
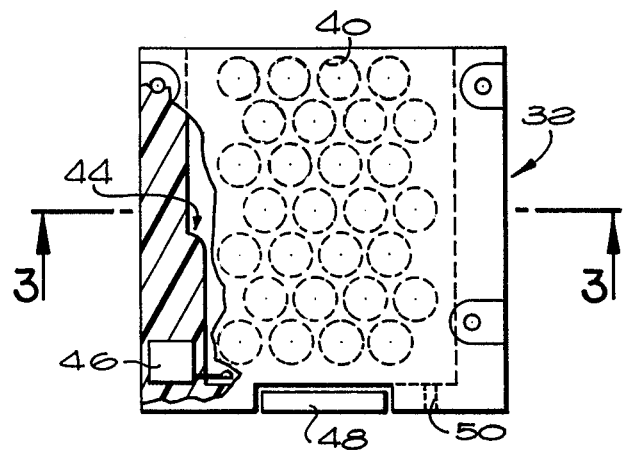
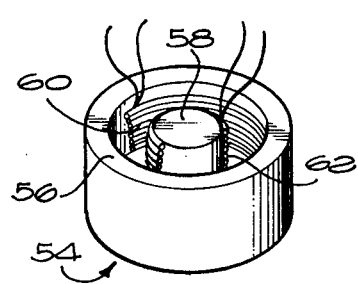
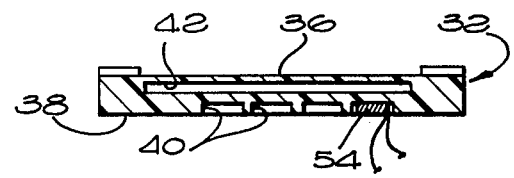
FIG.1    FIG.2    FIG.3    FIG.4
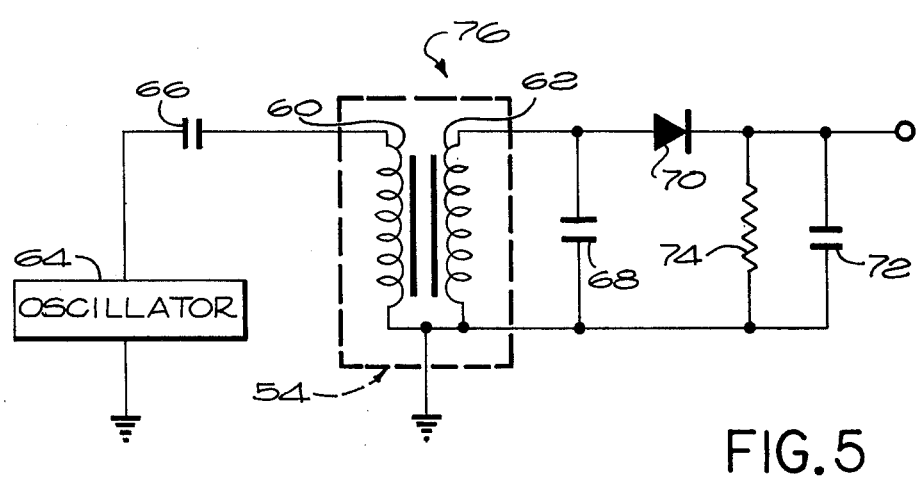
FIG.5

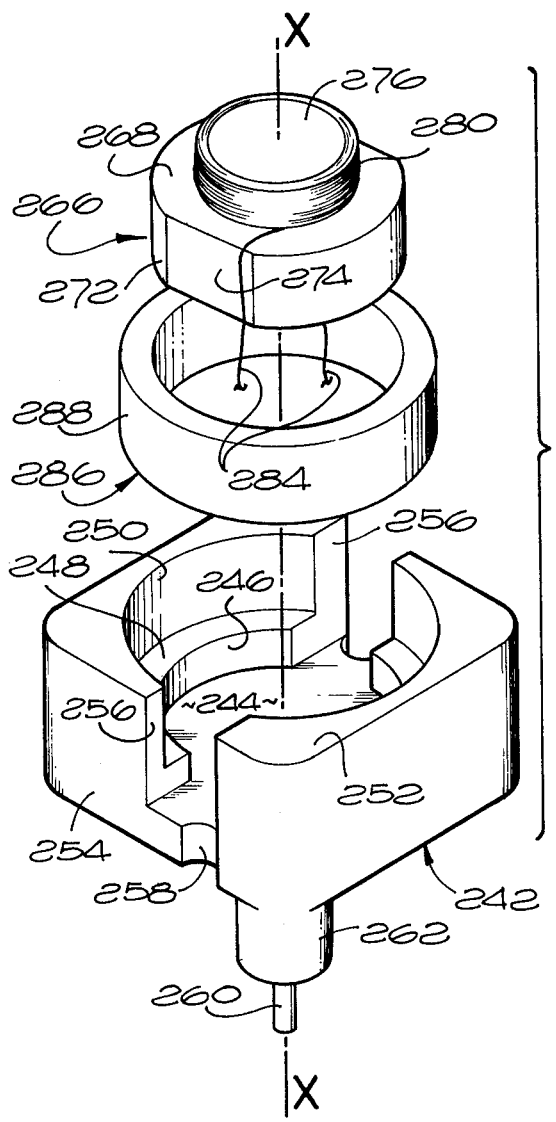
FIG. 11
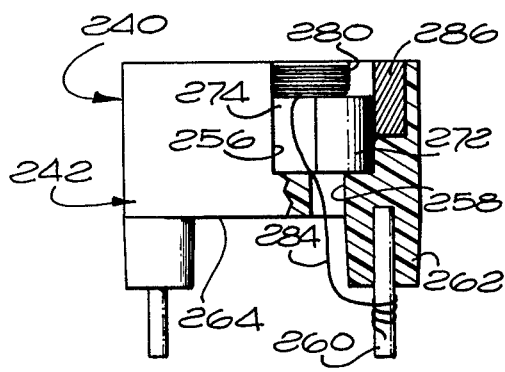
FIG. 12
FIG. 13
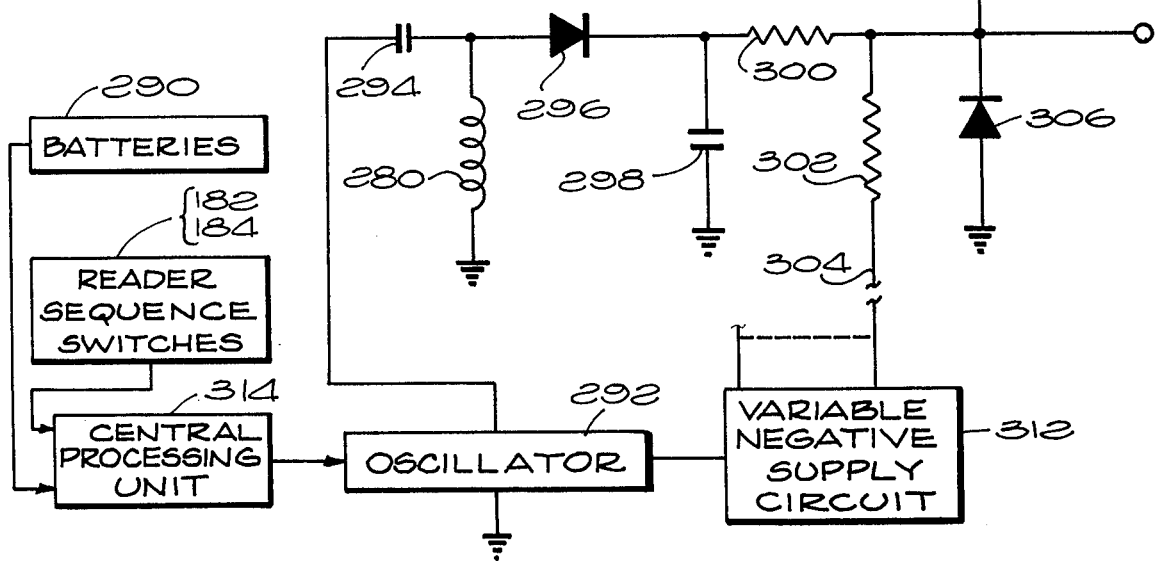

APPARATUS FOR PROVIDING AND SENSING CODED INFORMATION

CROSS REFERENCE TO RELATED APPLICATIONS

This application is a continuation-in-part of U.S. patent application Ser. No. 430,247 filed Jan. 2, 1974 entitled "Electronic Combination Lock and System".

BACKGROUND OF THE INVENTION

This invention relates to an apparatus for providing and sensing coded information, and more particularly to a system including a composite card adapted to carry a binary code and an electronic card reader for receiving the card and detecting the code.

This invention has particular application to use in buildings, such as hotels, having large numbers of rooms required to be locked, and is intended to replace the conventional mechanical lock and key system now in general use. Although this invention will be described in connection with such use, it will be understood that the apparatus of this invention may be used with many card systems requiring coded information to operate the system.

Typical coded card and card reader systems presently employ a variety of encoded cards, such as punched cards, concealed magnetic strips, visible magnetic ink, reflecting material, and the like. The readers for sensing the codes carried by such cards include optical scanners, capacitance switches, magnetic detectors, mechanical switches, and the like. However, such systems are relatively complex, expensive, often overly sensitive, and require considerable maintenance. For example, optical readers are very costly and have high maintenance requirements. Capacitance and magnetic ink readers are also quite expensive. Magnetic strips typically cannot contain large amounts of data. Other readers are quite bulky and slow, and frequently have large power requirements. In addition, the less expensive cards have generally been constructed in a manner which allows their usefulness to be easily destroyed.

The apparatus of this invention provides a card as part of a reader system which is compact, accurate and relatively inexpensive while at the same time having low maintenance and power requirements.

SUMMARY OF THE INVENTION

A system for providing and sensing coded information is provided in which a card, adapted to carry coded information, includes an electrically conductive material. The card is adapted to be encoded by selective removal of at least a portion of the electrically conductive material. Means are provided for receiving the card and sensing the information encoded on the card.

In one embodiment of the invention, the electrically conductive material is a metal layer secured to a portion of one side of a thin substrate of electrically nonconductive, nonmetallic material. A plurality of holes are selectively punched through the metal layer in data positions and through the underlying portions of the substrate to which the metal layer is secured to provide a code when the holes and the remainder of the metal layer are taken together. The substrate is adapted to be folded over onto itself to form a composite card with the coded metal layer between two outer layers of the substrate. The card receiving means includes a reader housing having a protrusion to prohibit access to a portion of the card reader. The sensing means includes a plurality of coils, each having a ferromagnetic core and a ferromagnetic sleeve encircling the core. The card reader housing receives the card in a manner to position the metal layer adjacent the coils. A notch is formed in one side of the card to receive the reader housing protrusion so that the card may be fully inserted into the reader housing only when correctly oriented, thereby aligning the coils and the data positions.

BRIEF DESCRIPTION OF THE DRAWINGS

In the drawings which constitute a part of this specification, exemplary embodiments demonstrating various features of this invention are set forth wherein:

FIG. 1 is a perspective view of the data combination card employed in the first embodiment of the invention with the top two card layers partly broken away;

FIG. 2 is an elevation view of the card reader employed in the first embodiment of the invention with the top surface partly broken away;

FIG. 3 is a cross-sectional view taken along the line 3—3 of FIG. 2;

FIG. 4 is a perspective view of one of the sensor elements mounted in the card reader of FIGS. 2 and 3;

FIG. 5 is a schematic representation of the sensor element of FIG. 4 and associated circuitry employed in the first embodiment of the invention;

FIG. 11 is an exploded perspective view of one of the sensor elements of the second embodiment of this invention;

FIG. 12 is a partly broken away elevation view of one of the sensor elements shown in FIG. 11; and, FIG. 13 is a schematic representation of the sensor element of FIGS. 11 and 12 and associated circuitry employed in the reader of the second embodiment of this invention.

DESCRIPTION OF THE INVENTION

Figure 6:
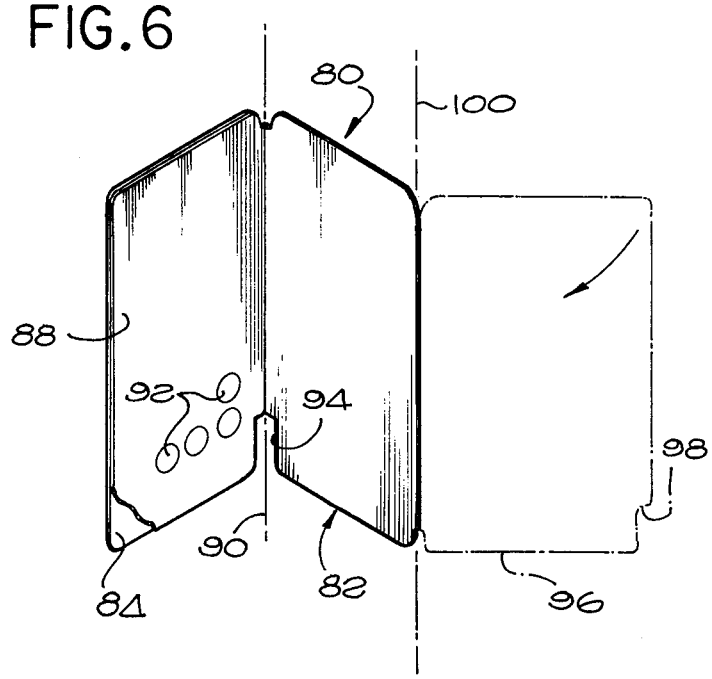
FIG. 6 is a perspective view, partly broken away, of the data combination card employed in the second embodiment of this invention.
Figure 10:
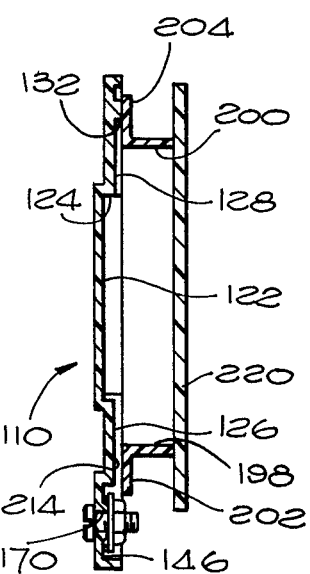
FIG. 10 is a cross-sectional elevational view taken along the line 10—10 of FIG. 7.

The data combination card employed in this invention may take many forms, such as raised ferrous or nonferrous metal spots on a nonmetallic substrate. However, in the first embodiment of this invention, the card 20 shown in FIG. 1 is originally an elongated rectangular strip, divided into three equal parts to be folded together from one end so that the end portion first folded finally becomes the central layer of the card. The card has three layers laminated together, the two outer layers 22 and 24 and the central layer 26 being composed of a nonmetallic, electrically insulating material, such as plastic, cardboard or the like. The central layer 26 also contains a predetermined matrix pattern of holes adapted to receive nonferrous metal plugs. However, in this embodiment of the invention, the nonferrous metal spots 28 are formed by a sheet of aluminum foil secured to the reverse side of central layer 26. Before the three layers are laminated together, some of the metal spots are punched out or removed from across the holes to create a binary code or combination of holes and metal spots on the central layer, which combination is later sensed to determine the code. The three layers are then laminated together so that the code is invisible and attempts to remove the outer layers will result in the destruction of the card and its code pattern.

Each card has an elongated notch 30 cut in one side to match a tab 44 in the card reader so that the card can be inserted into the card reader in only the one position which correctly positions the card's pattern of holes and spots in the reader.

A device (not shown) for encoding the data combination cards 20 may include anything from a sophisticated computer which stores masses of information to a simple manual paper and pencil procedure. One of the determining factors is the amount of information contained in the cards 20 which must be stored, either in an electronic memory or on paper, so that either a duplicate card or the next card in series can be encoded at a later time.

In this first embodiment of the invention where the card constitutes a hotel room key, the combination code of each card is divided into four parts which are used to designate the type of card, the hotel and room number, an old code, and a new code. If a machine is employed to encode the cards, it will have a logic portion, an active memory, a random number generator, thumb wheels or other means for entering information, and a device for removing or punching metal spots from the cards. When a new card is to be encoded, the central layer 26 is inserted into the machine and the type of card, such as a guest card, and the room number are manually set into the machine by rotating appropriate thumb wheels. The encoding machine will already have stored in its memory the hotel code and the new and old codes for the last card of that type issued for that particular room. The electronic encoding machine will encode as the card's new code a random number from the random number generator and the card's old code will be the previous card's new code. When this information is provided, the encoding machine will actuate the appropriate punches to remove selected metal spots 28 from the middle layer 26 and thereby encode the card with this information in binary form. The card is then withdrawn from the encoding machine and laminated together so that the middle layer 26 is concealed between the two outer layers 22 and 24.

If a duplicate card is desired, the same procedure is followed except that both the old and new codes of the previous card are recalled from memory and encoded in the old and new code positions respectively of the duplicate card.

As previously mentioned, this procedure could be performed manually by employing a pencil and paper to record the necessary information and to remove the appropriate metal spots 28. While this would be extremely time-consuming and awkward for use in a hotel, it might be very well suited to home use.

The card reader of this first embodiment, shown in FIGS. 2 and 3, is composed of an electrically insulating, nonmetallic material, such as plastic or the like, and has a relatively thin planar wall 36. The opposed thicker wall 38 contains a predetermined pattern of cylindrical sensor receptacles 40 which correspond in size and location to the pattern of metal spots and holes in the card 20. Receptacles 40 terminate short of the recess 42 so that a thin layer of plastic separates the sensor receptacles from a card positioned in the recess to protect the sensors 54. The tab 44 extending into the recess 42 permits a data card to be inserted only when its mating notch 30 is correctly positioned so that the card holes and metal spots are aligned with adjacent cylindrical receptacles 40.

Microswitch 46 in the bottom of card reader 32 is actuated by any correctly inserted card to connect batteries (not shown) to the card reader sensors.

A female printed circuitboard connector 48 at the bottom open end of recess 42 receives an emergency override device or security pass unit. Drain hole 50 through the bottom of the card reader provides for moisture drainage.

In the first embodiment of this invention, the sensors 54 shown in FIG. 4 are small cylindrical cup-shaped blocks of ferrous metal, such as an iron compounds pot core, each having two coils 60 and 62 wound between a raised rim 56 and a raised center post 58. A sensor is secured in each sensor receptacle 40, as shown in FIG. 3, with the open end of the sensor cup adjacent the closed end of the receptacle.

The leads from the coils are wired to a printed circuit board where each sensor is electrically connected to a separate sensor circuit 76 (FIG. 5) to produce signals representing a logical binary "1" or "0" in response to the absence or presence respectively of a metal spot 28 adjacent the sensor. The coils 60 and 62 act as the primary and secondary coils respectively of an iron core transformer. In this first embodiment of the invention, the coils are chosen so that the turns ratio is 1 to 1, and the oscillator 64 provides intermittent bursts of high frequency constant amplitude signal, about three volts, through the tuned circuit of capacitor 66 and the coil 60. Capacitor 68 has the same value as capacitor 66, about 0.047 microfarads, so that the two circuits are tuned to about the same frequency when there is no metal spot 28 present. One tuned circuit includes capacitor 66 and the coil 60, and the second tuned circuit includes capacitor 68 and coil 62.

Diode 70 rectifies the signal induced in the secondary coil 62 to produce a direct current output across capacitor 72. Resistor 74, having a value of about 1 megohm, limits the output signal across capacitor 72, which has a value of about 0.01 microfarads.

As is well known, when the oscillator 64 provides alternating current through coil 60, which in turn induces an alternating current through coil 62, an alternating magnetic field is set up between the outer ring 56 and the center post 58 of the sensor. If nothing impedes this magnetic field, the signal across capacitor 72 will be relatively large, such as about 10 volts. However, when one of the nonferrous metal spots 28 is positioned adjacent to and across the top of the sensor, opposing magnetic fields are set up in the spot which change the mutual inductance between the coils 60 and 62 and block out a large amount of inductive transfer between the two coils, thus producing a much smaller output, such as about two volts. Thus, the binary logical "1" may be equated with the ten volt output while the binary logical "0" may be equated with the two volt output.

It will be apparent that by selectively removing metal spots 28, a large amount of coded information may be stored in binary form on each data card. This information is uniquely employed in this invention not only to open the door lock but also to conveniently change the previously set lock combination code without using any means other than a new card provided to the new room occupant or the like.

One type of electronic combination lock and system with which the embodiments of this invention may be employed in a hotel situation or the like is described and shown in allowed U.S. patent application Ser. No. 430,247 filed Jan. 2, 1974 entitled "Electronic Combination Lock and System", which is incorporated herein by reference in its entirety.

In the second embodiment of this invention, the data combination card 80 shown in FIG. 6 is composed of a thin rectangular substrate 82 divided into two equal parts 84 and 86 which are adapted to be folded together. The substrate 82 is composed of a non-metallic, electrically insulating material, such as plastic or plasticized paper. In this embodiment of the invention, the substrate 82 is a rectangular sheet composed of polystyrene about 0.010 inches thick. A thin sheet of metal 88 is secured to a first half 84 of the substrate so that when the second half 86 of the substrate is folded about the line 90 onto the first half 84, the metal sheet 88 forms a central layer between two outer layers 84 and 86 of substrate material. In the second embodiment of the invention, the metal sheet 88 is composed of a sheet of aluminum foil about 0.002 inches thick.

Before the substrate is folded, the card is encoded by punching out or removing areas of the metal in a predetermined manner to correspond with preselected positions of the sensing elements or sensors in the reader, as will be described hereinafter. In this second embodiment of the invention, the card is encoded by punching holes 92 entirely through the aluminum foil 88 and the underlying substrate 84. These holes are about 0.374 inches in diameter and are positioned in a linear rectangular matrix pattern containing 32 possible data positions or positions for such holes. This provides a very high density of the possible holes on the card, with the centers of the holes being spaced about 0.50 inches apart and the minimum distance between the edges of adjacent holes being only about 0.125 inches. The substrate halves 84 and 86 are secured together upon folding by a layer of dry adhesive or the like, about 0.001 inches thick, placed between the leaves of the substrate. As will be apparent, this card when folded will have two outer substrate leaves and a central layer of aluminum foil. The first outer leaf 84 to which the aluminum foil is secured will show the code pattern formed by punching out holes 92 through the aluminum foil 88 and through the underlying substrate 84.

A portion of the substrate 82 and aluminum foil 88 is removed to form an elongated notch 94 along the fold line 90 which will form one corner of the card to receive a tab or protrusion in the card reader, as will be described hereinafter. In this manner, the card may be fully inserted into the card reader in only one position, which position correctly aligns the data positions or pattern of possible holes in the card with the sensors in the card reader. In this second embodiment of the invention, before the card is folded the notch 94 extends into the card along the line 90 about 0.75 inches and is about 0.312 inches wide.

When it is desired to entirely conceal the encoded pattern from view, a third panel 96 of substrate material 82 is formed integrally with the substrate panel 86 opposite the panel 84 along fold line 100. This third panel 96 of substrate material is similar to the previously mentioned substrate panels except that the notch 98 is about 0.75 inches by about 0.156 inches. This construction allows both sides of the encoded substrate panel 84 to be concealed by first folding the aluminum foil 88 and first substrate panel 84 onto the adjacent second substrate panel 86 along the line 90 as previously described. The third substrate panel 96 is then folded onto the outside of the encoded first substrate panel 84 along the line 100 to form a composite card. This composite card has three layers of substrate material 84, 86 and 96 and one layer of aluminum foil 88 secured together, and is similar to the composite card 20 shown in FIG. 1.

The card reader 110 of the second embodiment of this invention, shown in FIGS. 7-10, is composed of an electrically insulating, non-metallic material, such as plastic or the like. The card reader 110 is a box-like structure consisting essentially of three parts — the bottom section 120, the frame member 190, and a printed circuit board 220, all secured together by adhesive, screws, or the like, to form the reader housing. The bottom section 120 is generally flat, having an elongated slightly depressed bottom wall 122 extending from one end to an enlarged female connector receptacle 136 at the rear of the housing. The enlarged slot 124, defined by the bottom wall 122 and the bottom of the frame transverse walls 192, 194 and 196 which will be described hereinafter, provides access for emergency devices which are narrower and thicker than the combination cards 80. Such security devices are adapted to plug into the female connector 138 mounted in recptacle 136 at the rear of the reader. The female connector 138 has terminals 142 protruding through slot 140 to connect to circuitry mounted on the printed circuit board 220.

Raised bottom flanges 126 and 128 along each side of the central depressed bottom wall 122 receive a side of a card 80 inserted into the reader. Side walls 130 and 132 extend upwardly from the raised bottom flanges 126 and 128 respectively to provide guides for the edges of an inserted card 80. A tab or protrusion 134 extends inwardly onto raised bottom flange 128 at the rear of the reader housing to permit a card 80 to be fully inserted into the housing only when the card's matching notch 94 is correctly positioned to receive the protrusion 134.

Figure 7:
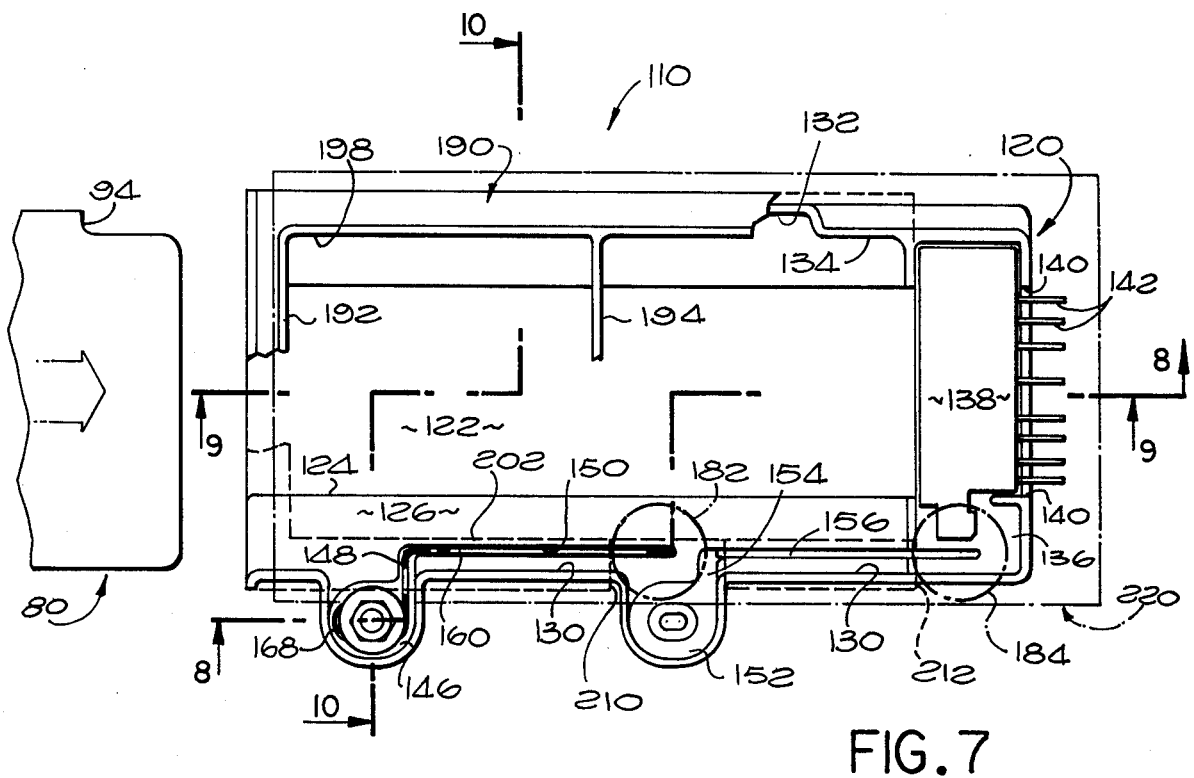
FIG. 7 is a plan view, partly broken away, of the card reader employed in the second embodiment of this invention.
Figure 8:
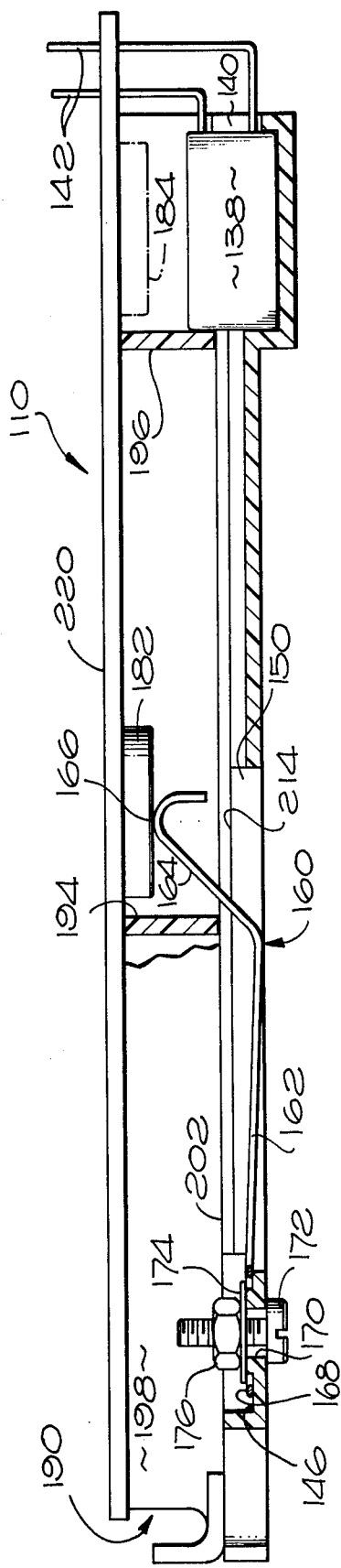
FIG. 8 is a partly broken away elevational view taken along the line 8—8 of FIG. 7.
Figure 9:
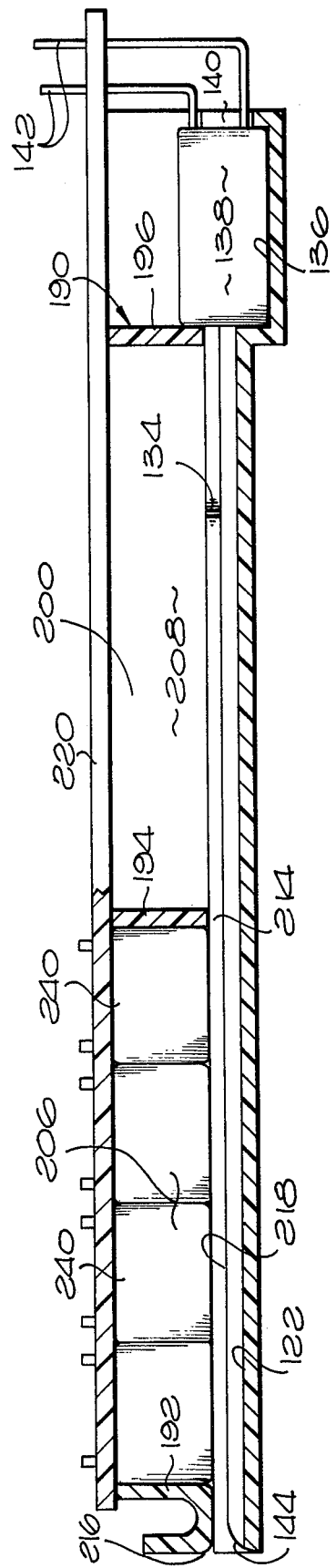
FIG. 9 is a cross-sectional, elevational view taken along the line 9—9 of FIG. 7.

Lands 146 and 152 protrude from one side of the housing below the level of the raised bottom flange 126 (FIGS. 7 and 8). Elongated slots 150 and 156 are cut through the raised bottom flange 126 adjacent the lands 146 and 152 respectively and are connected to the lands 146 and 152 by way of recessed channels 148 and 154 respectively. A spring is secured at one end in each land 146 and 152 to protrude downwardly through the adjacent slots 150 and 156 respectively out of the reader housing when the springs are contacted by an inserted card 80. The two springs are similarly constructed and secured, and therefore only the first spring 160 will be described in detail and shown.

As is best shown in FIGS. 7 and 8, the offset coiled end 168 of spring 160 is secured in land 146 by screw 172 passing through the hole 170 in the land 146, through the coiled spring end 168, and through a washer 174. As the nut 176 and screw 172 are tightened, the coiled end 168 of the spring 160 is clamped into the land 146 so that the spring follows the recessed channel 148 to the slot 150. The spring then bends about 90° so that spring portions 162 and 164 lie directly above or in the slot 150. The cam portion 164 of the spring 160 is bent upwardly at an oblique angle from the right angled portion 162 of the spring and into the reader housing. The end of the spring is bent downwardly to provide a contact portion 166 which normally bears against the first reader sequence switch 182. The first and second reader sequence switches 182 and 184 are pressure switches or the like, and their function will be described hereinafter. The sequence switches 182 and 184 are mounted on the printed circuit board 220 to depend into the reader housing in the area over the contact portions of the respective first and second springs in the slots 150 and 156. In this manner, a card 80 inserted into the reader passes over beveled forward ends 144 of the raised bottom flanges 126 and 128 and rides with its outer lower surfaces on the flanges 126 and 128. Upon further inward travel, the card will serially contact the upwardly sloping portion 164 of spring 160 to depress the spring through slot 150, and then similarly act upon the second spring in slot 156 to remove contact between the first and second springs and the respective first and second sequence switches 182 and 184.

A middle frame section 190 is held between the bottom section 120 and the printed circuit board 220 as previously described, and provides a top guide surface for an inserted card 80 or a security device as well as providing spacing for the sensors 240. Frame 190 includes three transverse or cross walls 192, 194 and 196 and side walls 198 and 200, all extending from the printed circuit board 220 down to the bottom section side walls 130 and 132. In this manner an upper guide surface is provided by the lower edges of transverse walls 192, 194 and 196 for a security device inserted into the recess 124. In addition, top guide flanges 202 and 204 extend over side walls 130 and 132 and over portions of the raised bottom flanges 126 and 128 respectively, in the same plane as the lower extremity of the transverse frame walls 192, 194 and 196, to provide, together with the transverse walls, an upper guide surface for a card 80 inserted into card slot 214 thereby defined in the reader.

A first rectangular volume 206 is defined by the frame walls 192, 194, 198 and 200 to hold a rectangular arrangement of 16 sensors or sensor elements 240, as will be explained hereinafter. The second rectangular volume 208 is defined by the frame walls 194, 196, 198 and 200 to receive circuit elements (not shown) mounted on the printed circuit board 220, or for additional sensors 240 if desired. More or fewer sensors could be provided in the volumes 206 and 208 depending on the type of card reading and the number of data positions desired.

As will now be apparent, the enlarged slot 124 provided between the depressed bottom wall 122 and the transverse frame walls 192, 194 and 196 receives a narrow, relatively thick security device which plugs into female connector 138 as previously described. Such security devices may, for example, operate to override the normal function of the door lock in case of a power failure or the like. A card 80 inserted into the reader will be received in slot 214 first between the beveled edges 144 of the lower flanges and the L-shaped guide wall 216 of the transverse wall 192. The card then travels between the two side walls 130 and 132, the raised bottom flanges 126 and 128 of the bottom section 120, and the frame guide flanges 202 and 204. The card is guided by these side walls and flanges into successive contact with the first and second springs to successively remove the springs from contact with the first and second switches 182 and 184 respectively. However, if a card notch 94 does not match the protrusion 134, the card will not be able to be inserted far enough into the reader to remove the second spring from contact with the switch 184 and the door will not open.

A notch 210 provided in the outwardly extending flange 202 of the frame 190 allows the upwardly extending portion 164 of the spring 160 to protrude through the flange 202 to contact the switch 182. A second notch is in effect provided for the similar upwardly extending portion of the second spring to contact switch 184 since flange 202 is terminated at edge 212 and therefore does not extend in the area between that portion of the spring and switch 184.

As is shown in FIGS. 7-10, the sensor elements 240 are secured to the printed circuit board 220 and protrude into the rectangular volume 206. The open ends of the sensors 240 and coils 280 terminate just short of the plane of the outwardly extending frame flanges 202 and 204 so that the open end of each sensor element 240 and coil 280 is approximately 0.0140 inches from the aluminum sheet 88 carried by an inserted card 80. The reader sequence switches 182 and 184 are also mounted on the printed circuit board to extend downwardly into the area above the upwardly extending portions of the springs in the slots 150 and 156. The switches 182 and 184 do not extend into the rectangular frame volumes 206 and 208.

In the second embodiment of this invention, each sensor 240, shown in FIGS. 11 and 12, is composed of an electrically nonconductive base member 242, composed of plastic or the like, a sensor bobbin 266, and a sensor sleeve 286. The sensor bobbin 266 and sleeve 286 are composed of a ferromagnetic material, such as pressed powdered iron. The base member 242 has a generally circular flat floor 244 surrounded by a perpendicular upstanding first interior wall 246. A narrow annular shelf 248 extends outwardly from the first wall 246 parallel to the floor 244 to a second perpendicular upstanding interior wall 250. The second wall 250 extends to the top wall 252 of the base member 242. Two opposed entrances 256 are machined through the base outer walls 254 extending from the plane of the floor 244 to the top wall 252. A notch 258 is cut into the exterior base wall 254 in the area of each of the entrances 256 and extends from the floor 244 to the bottom 264 of the base. Two metal pins 260 are each embedded into a leg 262 formed integrally with the bottom 264 of the base member 242 adjacent the notches 258 and are secured to the base member by adhesive or the like.

The hat shaped sensor bobbin 266 has a raised circular cylindrical center post 276 extending upwardly perpendicular from and formed integrally with a generally cylindrical pedestal 268. Shaved sides 274 are formed on two opposite sides of the pedestal side wall 272 to allow the wire leads 284 from the coil 280 to pass down the shaved sides 274 of the bobbin pedestal 268. The coil 280, composed of 40 gauge copper wire having about 240 turns, is wrapped around the bobbin center post 276. The outer diameter of the bobbin pedestal 268 is slightly less than the diameter of the base floor 244 so that the pedestal 268 rests on the floor 244 with the pedestal side wall 272 of the bobbin fitting snugly against the first side walls 246 of the sensor base 242. The side wall 272 of the sensor pedestal 268 extends above the base shelf 248 while the bobbin center post 276 terminates flush with the base top wall 252 when the bobbin is in position in the base. A bobbin sleeve 286, consisting of a cylindrical ring, rests on the base shelf 248 between the bobbin side wall 272 and the base second side wall 250. The sleeve is positioned so that it encircles the coil. The outer sleeve wall 288 extends parallel to the longitudinal axis X—X of the core 276 and coil 280.

When the sensor elements are assembled and secured together with adhesive or the like, the shaved sides 274 of the bobbin are positioned adjacent the entrances 256 in the sensor base so that the leads 284 of the coil 280 are easily passed between the bobbin sleeve 286 and the bobbin pedestal 268 in the open area provided by the shaved sides 274. The leads 284 then pass out of the base member through the entrances 256 and notches 258 to each be secured around one of the pins 260 by soldering or the like. The open end of the cup-shaped sensor or coil may be covered by securing a thin sheet of electrically non-conductive, non-magnetic material (not shown) across the top wall 252 of the sensor element.

The sensor elements 240 are secured in the circuit board 220 by passing the terminal pins 260 of each sensor element through the circuit board, securing the terminal pins to the circuit board by soldering or the like, and securing the circuit board to the reader housing so that the open end of each sensor element depends downwardly into the reader housing within the rectangular volume 206.

When the sensor terminals are wired into the printed circuit board, each sensor is electrically connected into a separate sensor circuit, shown in FIG. 13, to produce signals representing a logical binary "1" or "0" in response to the presence or absence of a spot of aluminum foil 88 carried by the card 80 adjacent the top wall 252 or open end of the sensor element. In this embodiment of this invention, the batteries 290 are connected to the oscillator 292 by a central processing unit 314 when signals are received from the reader sequence switches 182 and 184 previously described. The sequence switches 182 and 184 thus enable the sensors to read as a card 80 is moved into the card reader. As the card 80 contacts the first spring 160 to remove it from contact with the sequence switch 182, the oscillator 292 is turned on and the sensors immediately detect the code formed in the first 16 data positions on the forward or first inserted portion of the card. Control logic (not shown) within the central processing unit 314 receives signals provided by the sensors. When the card is fully inserted into the reader to remove the second spring from contact with the sequence switch 184, the control logic again receives the instantaneous signals from the sensors now aligned above the second 16 data positions on the second or rearward half of the inserted card. The sensed code is stored until the readings are completed, after which the central processing unit performs the necessary comparisons such as are described in copending patent application Ser. No. 430,247. This system of 16 sensor elements and the two readings initiated by the sequence switches effects a considerable cost savings over a system employing, for example, 32 sensor elements which all read at one time.

Only one oscillator 292 is required to operate all of the sensor circuits. In this second embodiment of the invention, the batteries 290 are 6 volt, 1 ampere-hour magnesium batteries providing D.C. power through the central processing unit 314 to the oscillator 292 when the reader sequence switches are activated. The oscillator provides a continuous high frequency, constant amplitude signal to all of the sensor circuits. Considering the one sensor circuit shown in FIG. 13, the oscillator 292 provides a 300 kilohertz, 6 volt signal to the tuned circuit consisting of capacitor 294 and coil 280. Capacitor 294 has a value of about 200 picofarads. Diode 296 rectifies the signal from the tuned circuit to produce a direct current output varying from about 0 to 72 volts. Capacitor 298, which has a value of about 33 picofarads, acts as a filter to provide a direct current signal, having maximum amplitude of about 72 volts, to a voltage divider. The voltage divider consists of resistors 300 and 302, having values of 330 kilohms and 560 kilohms respectively. The lead 304 of resistor 302 is connected to receive a negative D.C. signal from the variable negative supply circuit 312. The negative supply circuit 312 provides a variable reference voltage comprising a D.C. output varying from zero volts to between minus 15 to minus 30 volts depending upon the number of holes in the metal layer 88. The voltage divider thus provides D.C. current having a maximum amplitude of about 6 volts to the clamping circuit consisting of diodes 306 and 308. The terminal 310 of the diode 308 is connected to receive the positive output of the batteries 290. The clamping circuit prohibits the signal across the diode 306 from going above 6 volts and from going negative.

When the oscillator 292 provides an alternating current through the tuned circuit 294 and 280, an alternating magnetic field is set up by the coil 280 in the air gap between the bobbin center post 276 and the sleeve 286. The sleeve 286 shapes, directs and defines this magnetic field so that this field extending outwardly from the sensor is substantially isolated and contained within a defined cylindrical volume substantially coincident with the projected outer sleeve wall 288. As has been previously noted, the diameter of each hole 92 punched in aluminum foil 88 is approximately 0.375 inches while the outer diameter of the sleeve 286 is about 0.440 inches. It has been found that this combination of sensor coil 280 and sleeve 286 in close proximity with the slightly smaller diameter holes 92 will produce a shaped magnetic field which will be substantially unresponsive to adjacent areas of aluminum foil surrounding a hole 92 positioned directly above a sensor coil 280. In fact, the holes 92 may even be made somewhat smaller if desired. Thus, if the foil in a card lying directly above the open end of a cup-shaped sensor 240 or coil 280 in the air gap adjacent the center post 276 has been removed as previously described, nothing will impede the magnetic field and the signal across the diode 306 will be relatively large, such as about 6 volts. However, when the aluminum foil positioned in the air gap adjacent the center post and above a sensor has not been removed, eddy currents producing an opposing magnetic field will be set up in the aluminum foil which will change the inductance of the coil 280 and thus detune the previously tuned circuit 280 and 294. It has been discovered that this particular arrangement, in the presence of such an area of aluminum foil above the coil, will produce a relatively small output across the diode 306, such as about 0 volts. Thus, the binary logical "1" may be equated to the 6 volt output while the binary logical "0" may be equated to the 0 output. It should be noted that the sensing circuits may also be constructed to be detuned in the presence of a metal area adjacent the respective coils and to be tuned in the presence of holes 92. This would, however, require more power.

It will be apparent that a large amount of coded information may be stored in binary form on each card by selectively removing portions of the metal layer 88 on a card 80, as previously described, prior to inserting the card in the card reader. In addition, this information may be accurately sensed without interference from adjacent areas of metal which have not been removed.

While this invention has been shown and described in terms of particular embodiments, it will be understood that various modifications may be made without departing from the actual scope of the invention.

What is claimed is:

1. A card for providing coded information to means for receiving and sensing the information, wherein said means comprises at least one sensing coil and means for positioning the card in relation to the at least one coil, said card comprising:
   a substrate of electrically non-conductive, non-magnetically reactive material; and,
   a layer of magnetically reactive material adapted to be encoded by the selective removal of a portion of said magnetically reactive material from at least one of a plurality of data positions, said data positions being arranged in a predetermined pattern, said at least one data position being adapted to be aligned with and positioned adjacent said at least one coil,
   said layer of magnetically reactive material overlying at least a first portion of one side of the substrate, said substrate having a second portion of said one side which when folded about an edge contiguous with the first portion covers at least a first side of said at least one data position without increasing the amount of magnetically reactive material at said at least one data position, at least one of said portions of the substrate having means for securing the portions together in a folded position to form a composite card with said magnetically reactive layer substantially between said two portions of the substrate.

2. A card as defined in claim 1, wherein said magnetically reactive layer comprises a thin layer of electrically conductive metal overlying said first portion of the substrate, and wherein said selective removal forms at least one hole in said metal layer, said at least one hole and the remainder of the metal layer constituting said coded information.

3. A card as defined in claim 2, further comprising:
   means adapted to cooperate with said positioning means to allow full access by the card to the receiving means only when said cooperation is achieved; and,
   a third portion of said substrate which, when folded about an edge contiguous with the first portion, covers a second side of said at least one data position.

4. A card as defined in claim 2, wherein said metal layer comprises a sheet of aluminum.

5. A card as defined in claim 2 wherein said receiving and sensing means comprises a plurality of individual sensor coils.

6. A card as defined in claim 5 wherein said metal layer is restricted to a portion of one side of the substrate to provide a single metal layer between said two folded portions of the substrate.

7. A card as defined in claim 6 wherein said receiving and sensing means comprises an alternating current power source connected to said coils.

8. A card as defined in claim 1, wherein the mass of the magnetically reactive material remaining in a data position after said removal of a portion of the magnetically reactive material from said position is insufficient to substantially affect the efficiency of said adjacent sensing coil.

9. A card for providing coded information to a card reader adapted to receive a card wherein said card reader comprises a housing, an alternating current source and sensing means including a plurality of sensing coils connected to said alternating current source and mounted in said reader housing adjacent an inserted card, each coil having a ferromagnetic core and an annular ferromagnetic sleeve encircling the coil, said card comprising:
   a thin substrate of electrically non-conductive, non-magnetically reactive material and a thin layer of magnetically reactive material secured to at least a first portion of one side of said substrate, said layer having at least one hole formed in one of a plurality of data positions in said magnetically reactive layer, said at least one hole and portions of the remainder of the magnetically reactive layer constituting coded information, said substrate having a second portion of said one side which when folded about an edge contiguous with the first portion covers at least one hole without increasing the amount of magnetically reactive material at said covered hole, at least one of said portions of the substrate having means for securing the portions together in a folded position; and,
   means in said card whereby the data positions in the layer are aligned with said coils.

10. A card as defined in claim 9, wherein said magnetically reactive layer is metal and the diameter of said at least one hole is no smaller than about the inner diameter of any of said sleeves, whereby the signal across any said coil is substantially unaffected by the metal layer adjacent an aligned hole.

11. A card for providing coded information to means for receiving and sensing the information, wherein said means comprises at least one sensing coil and means for positioning the card in relation to said at least one sensing coil, said card comprising:
   a substrate of electrically non-conductive, non-magnetically reactive material; and,
   a predetermined pattern of data positions formed by the relative presence and absence of areas of magnetically reactive material overlying at least a first portion of one side of the substrate, said data positions being adapted to be aligned with and positioned adjacent to said at least one coil, said substrate having a second portion of said one side which when folded about an edge contiguous with the first portion covers at least a first side of said data positions without increasing the amount of magnetically reactive material at said positions, at least one of said portions of said substrate having means for securing the portions together in a folded position to form a composite card with said areas of magnetically reactive material substantially between said two portions of the substrate.

* * * * *